United States Patent
Harp

(10) Patent No.: US 8,756,339 B2
(45) Date of Patent: Jun. 17, 2014

(54) IP TRAFFIC REDIRECTION FOR PURPOSES OF LAWFUL INTERCEPT

(75) Inventor: David Harp, Plano, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 493 days.

(21) Appl. No.: 12/818,686

(22) Filed: Jun. 18, 2010

(65) Prior Publication Data

US 2011/0314177 A1    Dec. 22, 2011

(51) Int. Cl.
*G06F 15/16*    (2006.01)

(52) U.S. Cl.
USPC .................... 709/238; 706/1; 713/183

(58) Field of Classification Search
USPC ........................................... 709/238
See application file for complete search history.

(56) References Cited

U.S. PATENT DOCUMENTS

| | | | | |
|---|---|---|---|---|
| 5,884,024 | A * | 3/1999 | Lim et al. | 726/3 |
| 6,073,178 | A * | 6/2000 | Wong et al. | 709/229 |
| 8,041,022 | B1 * | 10/2011 | Andreasen et al. | 379/221.1 |
| 2002/0159578 | A1 * | 10/2002 | Bern et al. | 379/219 |
| 2004/0255126 | A1 * | 12/2004 | Reith | 713/183 |
| 2006/0034198 | A1 * | 2/2006 | Makinen et al. | 370/310 |
| 2006/0259928 | A1 * | 11/2006 | Di Serio et al. | 725/62 |
| 2007/0097976 | A1 * | 5/2007 | Wood et al. | 370/392 |
| 2007/0217423 | A1 * | 9/2007 | Hoffmann et al. | 370/392 |
| 2007/0287428 | A1 * | 12/2007 | Diacakis et al. | 455/414.1 |
| 2008/0276294 | A1 * | 11/2008 | Brady | 726/1 |
| 2008/0317019 | A1 * | 12/2008 | Popoviciu et al. | 370/389 |
| 2009/0100040 | A1 * | 4/2009 | Sheppard et al. | 707/5 |
| 2009/0138619 | A1 * | 5/2009 | Schnizlein et al. | 709/245 |
| 2009/0141883 | A1 * | 6/2009 | Bastien | 379/213.01 |
| 2009/0279432 | A1 * | 11/2009 | Solis et al. | 370/235 |
| 2010/0005190 | A1 * | 1/2010 | Shah et al. | 709/235 |
| 2010/0083364 | A1 * | 4/2010 | Fernandez Gutierrez | 726/13 |
| 2010/0162378 | A1 * | 6/2010 | Jayawardena et al. | 726/12 |
| 2010/0211688 | A9 * | 8/2010 | Wang et al. | 709/228 |
| 2011/0029667 | A1 * | 2/2011 | Imbimbo et al. | 709/224 |
| 2011/0141947 | A1 * | 6/2011 | Li et al. | 370/259 |
| 2011/0191467 | A1 * | 8/2011 | Imbimbo et al. | 709/224 |
| 2011/0202980 | A1 * | 8/2011 | Imbimbo et al. | 726/4 |
| 2011/0296719 | A1 * | 12/2011 | Sories et al. | 37/315 |

* cited by examiner

*Primary Examiner* — Hamza Algibhah
(74) *Attorney, Agent, or Firm* — Hartman & Citrin LLC

(57) ABSTRACT

Technologies for redirecting traffic associated with a target entity for purposes of lawful intercept are presented herein. According to one aspect, a request to monitor data packets associated with a target entity for purposes of lawful intercept is received. Once the request is received, the target entity is added to a lawful intercept list and assigned a lawful intercept IP address from a range of lawful intercept IP addresses. Each lawful intercept IP address may have a corresponding routing policy for routing data packets associated with the corresponding lawful intercept IP address to a lawful intercept capture system. The data packet is then routed to the lawful intercept capture system based on the routing policy of the lawful intercept IP address. The lawful intercept capture system captures the data packet and forwards the data packet to a next hop network entity associated with the data packet.

17 Claims, 6 Drawing Sheets

IP TRAFFIC REDIRECTION FOR PURPOSES OF LAWFUL INTERCEPT

TECHNICAL FIELD

Exemplary embodiments are related to redirecting Internet Protocol (IP) traffic in a network. More particularly, exemplary embodiments relate to redirecting IP traffic using advanced policy routing techniques for purposes of lawful intercept.

BACKGROUND

Internet service providers (ISPs) may be required by local, state or federal law enforcement agencies to capture data traffic from a particular target entity, such as a network device associated with a particular location or person for purposes of law enforcement and cyber-security. ISPs generally utilize IP network lawful intercept mechanisms that control, manage and capture the data traffic being received and sent to the monitored target entity. This typically involves physically installing an analysis device inline in the data path between the monitored target entity and the access network of the ISP. Multiple analysis devices may be installed such that each analysis device manages and captures data traffic for a corresponding monitored target entity.

As the number of monitored target entities increases, equipment, and installation costs for physically installing a separate analysis device for each monitored target entity also increases, which can become cost prohibitive. Further, the installation of an analysis device on the data path between the network router and the target entity requires temporarily disrupting service to the monitored target entity. In addition, the analysis device dedicated to the monitored target entity is not in use during times when the monitored target entity is not sending or receiving data packets. Therefore, the current IP network lawful intercept mechanism is not only costly to implement and disruptive, but also inefficient.

SUMMARY

Embodiments of the disclosure presented herein include methods, systems, and computer-readable media for redirecting traffic associated with a target entity for purposes of lawful intercept using policy routing. According to one aspect, a method for redirecting traffic associated with a target entity for purposes of lawful intercept includes receiving a request to monitor data packets associated with a target entity for purposes of lawful intercept. Once the request is received, the target entity may be added to a lawful intercept list. In this way, when a request to communicate is received from the target entity, it is determined if the target entity is on the lawful intercept list. Upon determining that the target entity with which the data packet is associated is on the lawful intercept list, the target entity is assigned a lawful intercept IP address from a range of lawful intercept IP addresses. Each lawful intercept IP address may have a corresponding routing policy that routes data packets associated with the corresponding lawful intercept IP address to a lawful intercept capture system. A data packet is then received and an origination IP address or destination IP address associated with the data packet is identified. It is then determined if the origination IP address or the destination IP address is in the range of lawful intercept IP addresses. Upon determining that the origination IP address or the destination IP address is in the range of lawful intercept IP addresses, the data packet is redirected to the lawful intercept capture system based on the routing policy of the lawful intercept IP address.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

Figure 1:
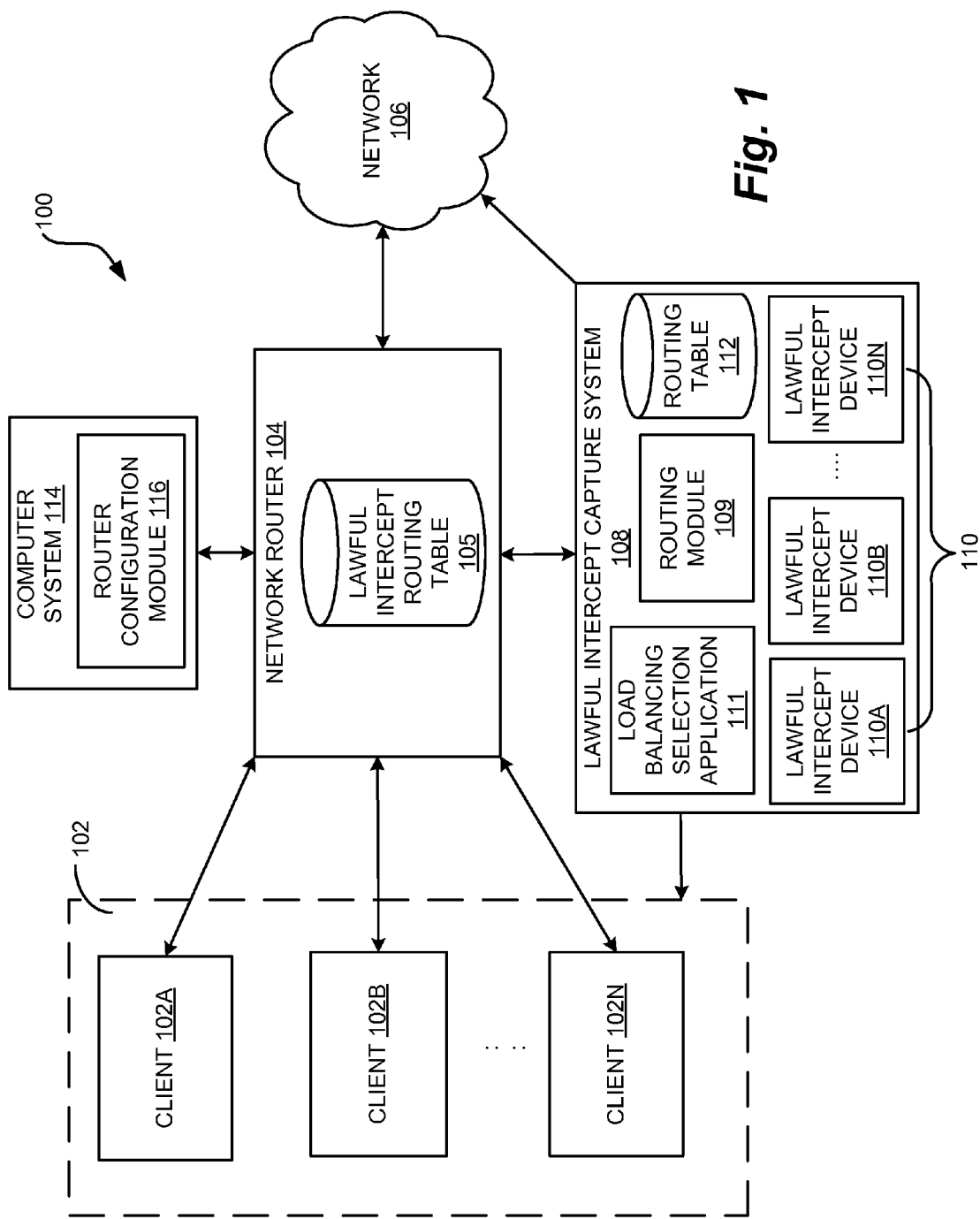
FIG. 1 illustrates an example operating environment for redirecting traffic associated with a target entity for purposes of lawful intercept, according to various embodiments.

The following detailed description is directed to methods, systems, and computer-readable media for redirecting traffic associated with a target entity for purposes of lawful intercept. According to exemplary embodiments, the present disclosure describes systems, methods, and computer-readable media for redirecting traffic associated with a target entity for purposes of lawful intercept to a lawful intercept capture system capable of capturing data packets associated with the target entity by utilizing advanced policy routing techniques.

Presently, internet service providers (ISPs) physically install an analysis device inline in the data path between the target entity and the access network of the ISP. This requires a single analysis device for monitoring a single target entity. As the number of target entities increase, costs associated with installing the equipment, including labor and device costs, makes the present solution cost prohibitive. Also, during times when a target entity is not sending or receiving data, the analysis device associated with the target entity is not in use. These problems render the present solution both costly to implement and inefficient.

Through the implementation of the present disclosure, data packets associated with a target entity may be redirected to a lawful intercept capture system configured to capture the data packets associated with the target entity before being forwarded toward a final destination. The embodiments of the present disclosure do not require physically installing an analysis device inline in the data path between the target entity and a network router. Instead, the embodiments of the present disclosure utilize advanced routing policy techniques to redirect data packets associated with the target entity to the lawful intercept capture system based on the origination IP address or destination IP address of the data packets.

According to exemplary embodiments, a network router on the network may be configured to receive an instruction to begin monitoring a target entity for purposes of lawful intercept. The network router may then assign the target entity a lawful intercept IP address that has a corresponding routing policy that redirects the data packets associated with the target entity to a lawful intercept capture system. The lawful intercept capture system captures the data packets before forwarding the data packets to a next hop network entity.

Typically, a data packet may be routed from the origination IP address to the destination IP address by hopping from one network entity to a next network entity until it reaches the destination IP address. Each network entity may have a routing table that includes a list of IP addresses and corresponding IP addresses of the next hop network entity to which the data packets associated with the IP addresses are to be routed. The network entity may utilize the routing table associated with the network entity to determine the next hop network entity to which the data packet is to be routed based on the destination IP address associated with the data packet. The network entity may then route the data packet to the determined next hop network entity.

The lawful intercept capture system may be configured to receive data packets from the network router and capture them on a storage device, before forwarding the data packets to the next hop network entity. By way of the present disclosure, technologies are provided herein for capturing data packets associated with one or more target entities for purposes of lawful intercept using a virtual lawful intercept capture system that does not require installing an analysis device inline in the data path between each of the one or more target entities and the network router.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which, by way of illustration, are shown as specific embodiments, or examples. Referring now to the drawings, like numerals will represent like elements through the several figures. For the sake of ease of understanding, details pertaining to embodiments of the present disclosure will be explained by way of specific examples.

FIG. 1 illustrates an operating environment 100 for redirecting traffic associated with a target entity for purposes of lawful intercept. In particular, the operating environment 100 includes one or more clients, such as a client 102A, 102B, 102N, generally referred to hereinafter as clients 102. The clients 102 may be configured to send and receive data over a network 106 via a network router 104. The clients 102 may be a network entity, such as a home router, modem, a computing device, such as a personal computer, a mobile device, a server, a video game console, any other device capable of sending and receiving data packets, or any other device that serves as a gateway for data packets associated with a particular location. In this way, if a law enforcement agency wants to monitor a particular client, the client may be identified by the network router 104 as a target entity for lawful intercept purposes by the network router 104.

Data packets generally include a header or some other component that identifies the sender and intended receiver of the data packet. The header of a data packet may include an origination IP address indicating the sender's IP address and a destination IP address indicating the intended receiver's IP address. In this way, network entities, such as network routers, across the network may be able to analyze a data packet to identify an IP address from which the data packet was sent and an IP address to which the data packet is destined.

The clients 102 may be configured to connect to the network router 104. According to embodiments, a client, such as the client 102A, may be connected to the network router 104 via a cable. In other embodiments, one or more of the clients 102 may be connected to the network router 104 via a wireless connection. The network router 104 may be configured to assign an IP address to the one or more clients 102 before the clients 102 may send or receive data packets. Typically, a client, such as client 102A may be assigned a specific IP address for a single session, which extends from the time the client 102A begins its communication with the network router 104 until the time the client 102A ends any communication with the network router 104. The network router 104 may be configured to assign an IP address to the client 102 based on the routing policy of the IP address such that clients that are to be monitored for purposes of lawful intercept are assigned special IP addresses. In this way, the network router 104 may be able to capture data packets associated with the special IP addresses by routing the data packets to a lawful intercept capture system 108, which is described in detail below.

According to exemplary embodiments, the network router 104 may be configured to receive one or more data packets from one or more clients 102 and forward the one or more data packets over the network 106 toward the destination IP address associated with the one or more data packets. The network router 104 may include a lawful intercept routing table 105. The lawful intercept routing table 105 may be a database that is stored on or is coupled to the network router 104. The lawful intercept routing table 105 may define a range of lawful intercept IP addresses, such as a range of lawful intercept IP addresses 262 shown in FIG. 2B and a redirection IP address, such as a redirection IP address 264 also shown in FIG. 2B corresponding to the range of lawful IP addresses. For example, the redirection IP address may be the IP address of the lawful intercept capture system 108.

The network router 104 may further be configured to receive an instruction from a computer system 114 that instructs the network router to start or stop monitoring the target entity for purposes of lawful intercept. Upon receiving the instruction to start monitoring the target entity, the network router 104 may add the target entity to a lawful intercept list, such as a lawful intercept list 208 shown in FIG. 2A, and subsequently assign a lawful intercept IP address from the range of lawful intercept IP addresses to the target entity. In this way, data packets associated with the target entity may have a corresponding lawful intercept IP address. By monitoring the lawful intercept IP address, the network router 104 can identify data packets associated with the target entity and route these data packets to the lawful intercept capture system 108 identified by the redirection IP address.

Unlike conventional network routers that analyze only the destination IP address of a data packet, when the network router 104 receives a data packet, the network router 104 determines the origination IP address and/or the destination IP address of the data packet by analyzing the header information of the data packet. The network router 104 then performs a look-up operation in the lawful intercept routing table 105 associated with the network router 104 to determine whether the origination IP address and/or the destination IP address lies within the range of lawful intercept IP addresses. If the origination IP address and/or the destination IP address associated with the data packet is in the range of lawful intercept IP addresses, the network router 104 routes the data packet to the lawful intercept capture system 108 identified by the redirection IP address. Further details regarding how the network router 104 sends data packets to the lawful intercept capture system 108 will be provided below with reference to FIGS. 2 and 4. The network 106 may include one or more network layers. According to embodiments, telecommunication companies may utilize different network layers that have different bandwidths for the distribution and delivery of data packets between the companies' consumers and the Internet. For example, a telecommunication company may connect a consumer at home to the Internet via a series of network layers with increasing bandwidths. For instance, connection lines originating from consumer homes in a particular district may converge at an access network centrally located within the district. Each district may have its own access network. The access networks of various districts within the city make up the access network layer. The access networks of the various districts may consolidate at a distribution network, which may be centrally located within the city. Similarly, other cities may also have their own distribution network.

Access networks within each city may consolidate at a corresponding distribution network centrally located within each city. The distribution networks of various cities within a state may make up the distribution network layer. The distribution networks of the various cities may consolidate at a transport network, which may be centrally located within the state. The transport network may be a gateway to the Internet for the entire State. It should be appreciated that each telecommunication company may have a different network layer architecture, including one or more layers that connect a consumer to the Internet. For the purposes of the present disclosure, the network router 104 may operate within the access network layer. However, in alternative embodiments, the network router 104 may be a part of any of the other network layers within the network 106.

Through an implementation of the network architecture described above, a computer associated with a consumer's home may connect to the Internet. A data packet from a consumer's home may be sent to the access network within the district of the consumer's home. From the access network, the data packet may be routed to the distribution network. From the distribution network, the data packet may then be routed to the transport layer, before finally being routed to the Internet. It should be appreciated that the bandwidth of a link connecting the Internet and the transport network layer may be larger than the bandwidth of a link connecting the transport network layer and the distribution network layer. Further, the link connecting the transport network layer and the distribution network layer may be larger than the bandwidth of a link connecting the distribution network layer and the access network layer, which in turn may be larger than the bandwidth of a link connecting the access network layer to a consumer's home.

According to embodiments, the network router 104 may be connected to the lawful intercept capture system 108, which may control one or more lawful intercept capture devices, such as a lawful intercept capture device 110A, 110B, 110N, generally referred to hereinafter as lawful intercept capture devices 110. The lawful intercept capture devices 110 may reside within the lawful intercept capture system 108 or may be separate entities that reside outside the lawful intercept capture system 108 but remain under the control of the lawful intercept capture system 108. The lawful intercept capture devices 110 may be physical lawful intercept capture devices 110 that include one or more storage devices for storing the data packets or virtual lawful intercept capture devices 110 capable of capturing data packets on a storage device associated with the one or more virtual lawful intercept capture devices 110.

The lawful intercept capture system 108 may also include a routing module 109, a load balancing selection application 111, and a routing table 112. The routing module 109 of the lawful intercept capture system 108 may be configured to route data packets that are captured by the lawful intercept capture devices 110 to the next hop network entity associated with the data packet. According to embodiments, the routing table 112 may include a routing policy that indicates the next hop network entity to which the data packet is to be routed. The next hop network entity may be one of the clients 102 or any network entity that lies within the data path between the origination IP address and the destination IP address of the data packet.

As the number of clients 102 being monitored for purpose of lawful intercept increases, it may be desirable to increase the number of lawful intercept devices to manage the load of the increased number of clients 102. According to embodiments, the lawful intercept capture system 108 may be configured to manage and control the one or more lawful intercept capture devices such that any changes to the lawful intercept capture devices may be handled locally without altering the configuration of the network router 104 each time a new lawful intercept capture device is added or an existing lawful intercept capture device is removed.

As described above, the network router 104 may be configured to route data packets associated with a lawful intercept IP address to the lawful intercept capture system 108. Upon receiving the data packets from the network router 104, the lawful intercept capture system 108 may be configured to select the one or more lawful intercept capture devices 110 to which the data packets are to be routed. Upon selecting the one or more lawful intercept capture devices 110 to which the data packets are to be routed, the data packets may be redirected to the one or more lawful intercept capture devices 110. The lawful intercept capture devices 110 may then capture the data packets routed from the lawful intercept capture system 108.

According to embodiments, the lawful intercept capture system 108 may include the load balancing selection application 111 that is capable of selecting the one or more lawful intercept capture devices 110 which are to be utilized for capturing the data packets received from the network router 104. The load balancing selection application 111 may be configured to evenly distribute the load of capturing data packets among the lawful intercept capture devices 110. According to embodiments, the load balancing selection application 111 may monitor utilization information, such as the current and forecasted utilization of each of the lawful intercept capture devices 110. The load balancing selection application 111 may route a data packet to the appropriate lawful intercept capture device, such as the lawful intercept capture device 110A, based on the current and forecasted utilization of the lawful intercept capture device 110A relative to the current and forecasted utilization of the other lawful intercept capture devices 110B, 110N.

Figure 2A:
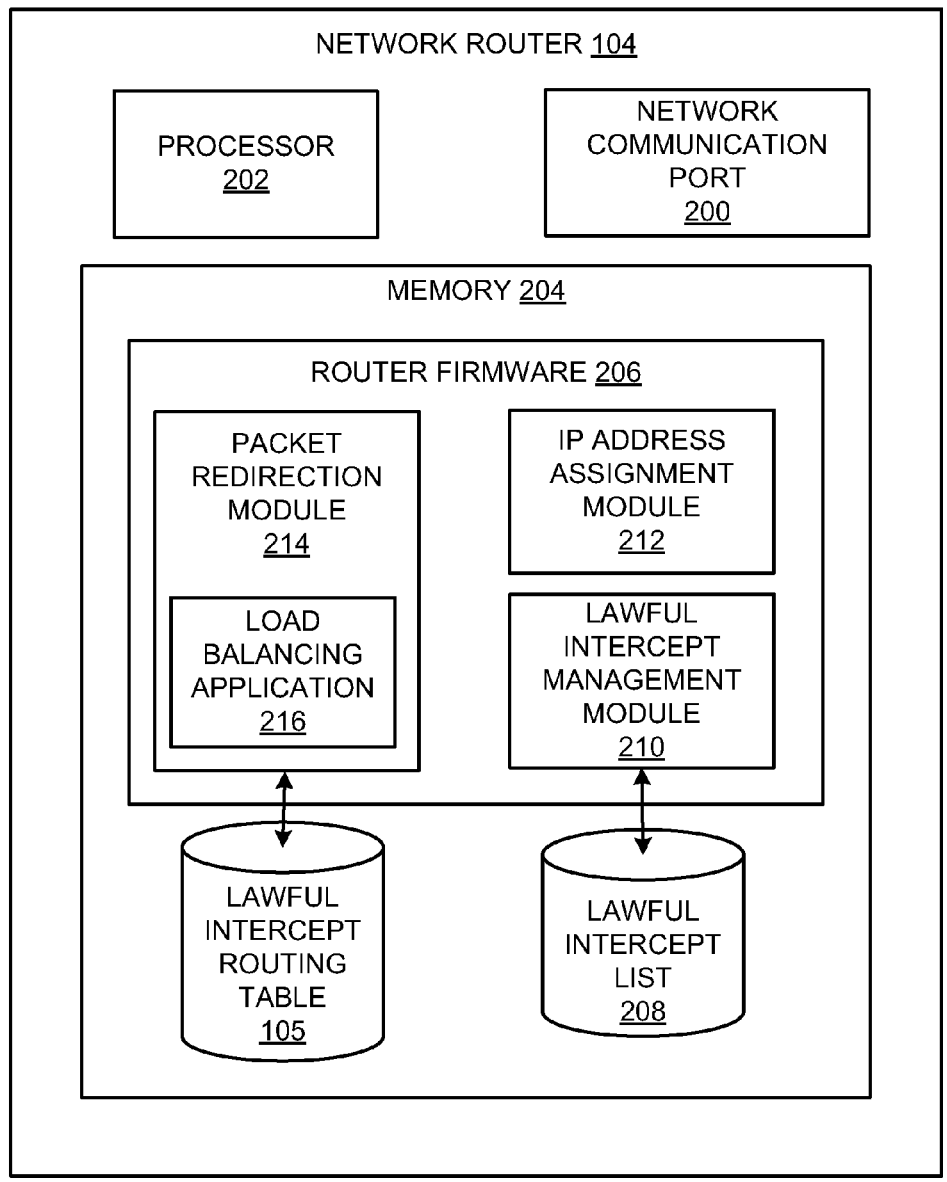
FIG. 2A is an example block diagram illustrating a detailed view of a network router, according to various embodiments.

According to embodiments, the network router 104 may also include a load balancing application, such as a load balancing application 216, which is described in further detail in regard to FIG. 2A. In some implementations, the load balancing selection application 111 of the lawful intercept capture system 108 may operate in conjunction with the load balancing application 216 of the network router 104. In some other implementations, the load balancing selection application 111 may be omitted from the lawful intercept capture system 108, and the load balancing application 216 may perform the above-described functionality of the load balancing selection application 111. In such implementations, the network router 104 may be configured to select an appropriate lawful intercept capture device, such as the lawful intercept capture device 110A, to capture data packets associated with a lawful intercept IP address. Details regarding how the network router 104 may be configured to select an appropriate lawful intercept capture device will be described with reference to FIG. 2A below.

In various embodiments, the lawful intercept capture system 108 may be implemented as hardware, firmware, software, or a combination thereof. The lawful intercept capture system 108 may be configured to capture data packets on a storage server accessible to the lawful intercept capture system 108. In this way, the lawful intercept capture system 108 may be implemented on an existing network router or other computing device without the use of any additional hardware.

According to embodiments, the lawful intercept capture system 108 may be a part of the access network layer. In further embodiments, the lawful intercept capture system 108 may be located on the distribution network layer, the transport network layer, or any other layer that may be capable of routing data packets to and from a consumer and the Internet. However, due to current technological limitations, the lawful intercept capture system 108 may not be able to handle the amount of traffic at network layers that have much higher bandwidths than the access network layer. Therefore, it should be appreciated by those skilled in the art that the placement of the lawful intercept capture system 108 is a design choice. It should be appreciated that the scope of the present disclosure is not limited to the use of the lawful intercept capture system 108 within the access network, but rather entails the use of the lawful intercept capture system 108 at any network layer that may be capable of routing data packets from an origination IP address to a destination IP address.

The network router 104 may also be configured to communicate with a computer system 114. The computer system 114 may be a local computer system that may be connected directly to the network router 104 or a remote computer system that is capable of connecting to the network router 104 via a network, such as the network 106. The computer system 114 may include a router configuration module 116 configured to control aspects of the network router 104, including providing instructions to the network router 104 to start or stop monitoring data packets associated with one or more of the clients 102 linked to the network router 104.

Typically, a data packet sent from an origination IP address to a destination IP address follows a data path, which includes one or more hops between various network entities (e.g., network routers) to reach the destination IP. In traditional operating environments that do not implement the lawful intercept capture system 108, a traditional network router (not shown) that lies in the data path receives the data packet. The traditional network router analyzes the data packet and determines the destination IP address of the data packet. The traditional network router then performs a look-up operation of the destination IP address in a traditional routing table (not shown) associated with the traditional network router to determine a network entity to which the data packet should be forwarded for the data packet to eventually reach the destination IP address. According to embodiments, a network entity may be any entity that is a part of a network. For instance, the network entity may be a network router in the distribution network layer, transport network, a server, a client, or any other device associated with the origination IP address or destination IP address. It should be appreciated that the lawful intercept capture system 108 may operate like a traditional network router upon capturing the data packet.

By way of the present disclosure, the network router 104 may redirect a data packet associated with lawful intercept IP addresses to the lawful intercept capture system 108 for purposes of lawful intercept. According to embodiments, the network router 104 first analyzes the data packet to identify an origination IP address and/or a destination IP address. The network router 104 then compares the origination IP address and the destination IP address of the data packet to the range of lawful intercept IP addresses on the lawful intercept routing table 105. If the origination IP address and/or the destination IP address of the data packet is within the range of lawful intercept IP addresses on the lawful intercept routing table 105, the network router 104 redirects the data packet to the IP address corresponding to the lawful intercept capture system 108 identified by the redirection IP address. The lawful intercept capture system 108 may then forward the data packet to one of the lawful intercept capture devices 110, where the data packet is captured. The lawful intercept capture system 108 may then forward the data packet to the next hop network entity based on a routing table 112 of the lawful intercept capture system 108.

Referring now to FIG. 2A, a detailed view of the network router 104 is shown. The network router 104 may include one or more network communication ports, such as a network communication port 200 for communicating with the one or more clients 102, the lawful intercept capture system 108, the computer system 114 and other network entities via the network 106. It should be appreciated that the network router 104 may utilize one or more additional networks, wireless connections, cables, and other known types of data connections to communicate with the one or more clients 102, lawful intercept capture system 108, and the computer system 114. The network router 104 may also include a processor 202, a memory 204 that may store a network router firmware 206, the lawful intercept list 208, and the lawful intercept routing table 105.

According to the various embodiments described herein, the network router 104 may be a separate computing entity. In alternative embodiments, the network router 104 may be a part of a host computing entity. In such embodiments, the network router 104 may not include the network communication port 200, the processor 202, or the memory 204. Instead, the network router firmware 206 may be stored on a memory of the host computing entity, and instructions stored in the network router firmware 206 may be executed by a processor of the host computing entity.

The network router firmware 206 may include various modules configured to perform the functions of the network router 104. In particular, the network router firmware 206 may include a lawful intercept management module 210, an IP address assignment module 212, and a packet redirection module 214, which may include the load balancing application 216 previously mentioned in regard to FIG. 1.

According to embodiments, the lawful intercept management module 210 may be configured to receive an instruction from the computer system 114 to start and/or stop monitoring a target entity under the control of the network router 104 for the purposes of lawful intercept. For instance, the lawful intercept management module 210 may receive an instruction from the computer system 114 to start monitoring a target entity, such as the client 102A that is under the control of the network router 104. The lawful intercept management module 210 may then add the client 102A to the lawful intercept list 208.

In this way, when the client 102A sends a request to the network router 104 to begin communicating with the network router 104 for sending and/or receiving data packets, the IP address assignment module 212 may determine whether the client 102A is to be assigned a lawful intercept IP address or a default IP address that is not within the range of the lawful intercept IP addresses. The IP address assignment module 212 may determine whether the client 102A is to be assigned a lawful intercept IP address or a default IP address by performing a look-up operation in the lawful intercept list 208. Performing a look-up operation in the lawful intercept list 208 may include searching the lawful intercept list 208 for the client 102A. If the IP address assignment module 212 determines that the client 102A is on the lawful intercept list 208, the IP address assignment module 212 may assign a lawful intercept IP address to the client 102A. However, if the IP address assignment module 212 determines that the client 102A is not on the lawful intercept list 208, the IP address assignment module 212 may assign a default IP address to the client 102A.

The packet redirection module 214 of the network router 104 may be configured to route data packets received by the network router 104 to a next hop network entity, the lawful intercept capture system 108, or a particular lawful intercept capture device, such as the lawful intercept capture device 110A. According to embodiments, the next hop network entity may be a network entity such as another network router or a client, such as the client 102A, linked to the network router 104. According to embodiments, the packet redirection module 214 may then determine the origination IP address and the destination IP address associated with the data packet. The packet redirection module 214 may determine the origination IP address and/or the destination IP address associated with the data packet by analyzing the header information associated with the data packet.

Upon determining the origination IP address and/or the destination IP address associated with the data packet, the packet redirection module 214 may be configured to perform a look-up operation on the lawful intercept routing table 105 to determine the next hop network entity or lawful intercept capture system to which the data packet is to be routed. The packet redirection module 214 may determine whether the origination IP address and/or the destination IP address lies within the range of lawful intercept IP addresses in the lawful intercept routing table 105. If the origination IP address and/or the destination IP address is within the range of lawful intercept IP addresses, the packet redirection module 214 may route the data packet to the redirection IP address designated by the lawful intercept routing table 105. According to embodiments, the redirection IP address designated by the lawful intercept routing table 105 identifies the lawful intercept capture system 108 or a particular lawful intercept IP device, such as the lawful intercept device 110A.

Further, if the law enforcement agency no longer wants to monitor the target entity, the computer system 114 may send an instruction to the network router 104 to remove the target entity from the lawful intercept list 208. According to embodiments, the lawful intercept management module 210 of the network router 104 may receive the instruction from the computer system 114 to remove the target entity from the lawful intercept list 208. Upon receiving the instruction, the lawful intercept management module 210 may remove the target entity from the lawful intercept list 208. According to embodiments, the IP address assignment module 212 may then assign a default IP address to the target entity such that data packets associated with the target entity are no longer routed to the lawful intercept capture system 108.

The packet redirection module 214 may also include the load balancing application 216, which may be configured to receive utilization information associated with one or more of the lawful intercept capture devices 110 within the lawful intercept capture system 108. Based, in part, on the utilization information, the load balancing application 216 may be configured to inform the IP address assignment module 212 of the utilization information of each of the lawful intercept devices 110. In embodiments where lawful intercept IP addresses are configured to be routed to one of the lawful intercept capture devices 110 based on a range of lawful intercept IP addresses defined in the lawful intercept routing table 105, the IP address assignment module 212 may assign a particular target entity a lawful intercept IP address that corresponds to a lawful intercept capture device that has a lower utilization than the other lawful intercept capture devices.

According to embodiments, the lawful intercept routing table 105 may define a special routing policy for a particular group of IP addresses. For example, the lawful intercept routing table 105 may define a first routing policy for routing data packets associated with a first group of IP addresses to the lawful intercept capture device 110A. Additionally, the lawful intercept routing table 105 may define a second routing policy for routing data packets associated with a second group of IP addresses to the lawful intercept capture device 110B. The lawful intercept routing table 105 may also define a third routing policy for routing data packets associated with a third group of IP addresses to the lawful intercept capture device 110N. In other embodiments, the packet redirection module 214 may send data packets to any of the lawful intercept capture devices 110 without assigning each of the lawful intercept capture devices 110 a particular group of IP addresses. Those skilled in the art may appreciate that these are simply design implementation choices, and are not intended to limit the scope of the present disclosure in any manner.

Figure 2B:
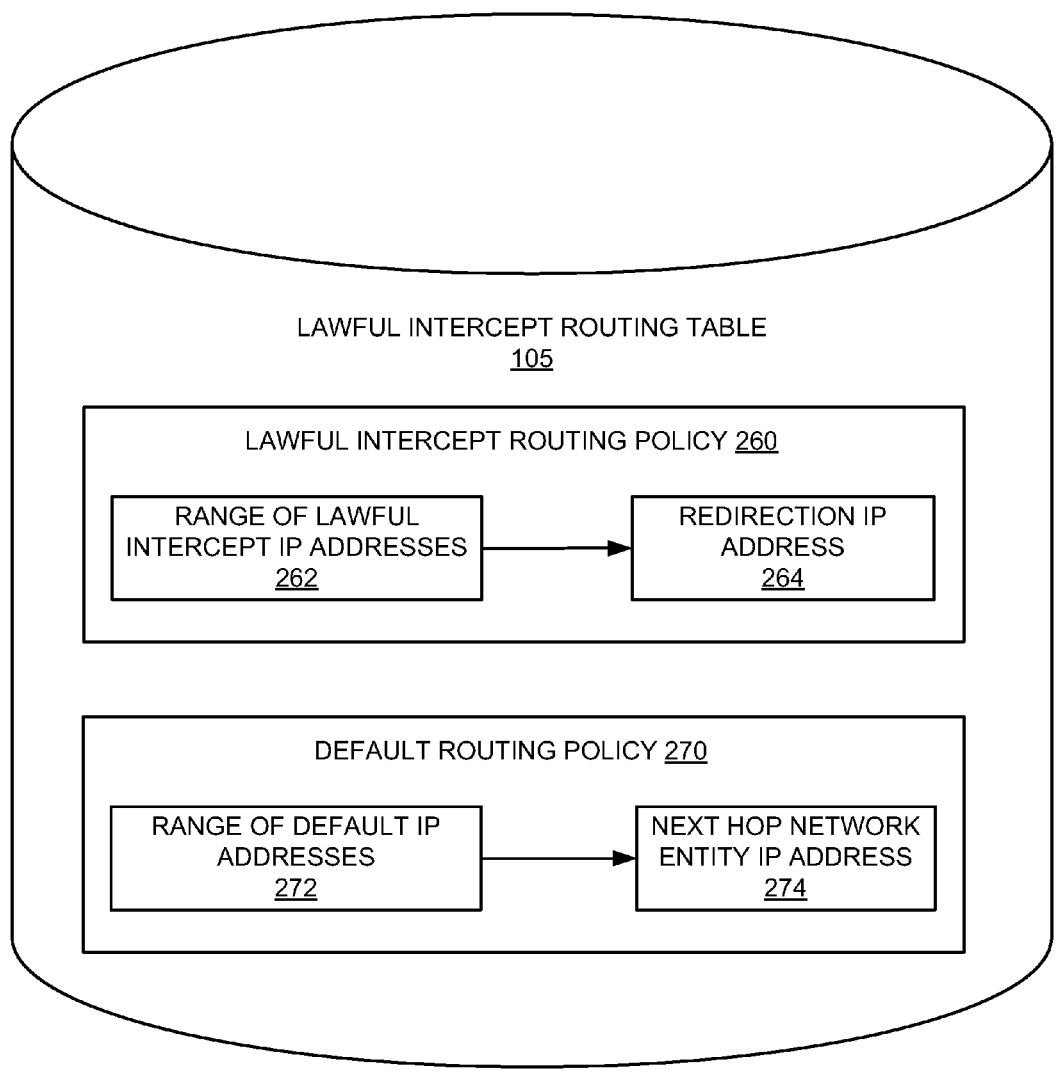
FIG. 2B is an example block diagram illustrating a detailed view of a lawful intercept routing table of the network router, according to various embodiments.

Referring now to FIG. 2B, an example block diagram illustrating a detailed view of the lawful intercept routing table 105 of the network router 104 is shown. The lawful intercept routing table 105 may include a lawful intercept routing policy 260 that includes a set of rules for redirecting data packets associated with IP addresses that are within a range of lawful intercept IP addresses 262 to a redirection IP address 264. As an example, the redirection IP address 264 may be the IP address of the lawful intercept capture system 108. In a further example, the lawful intercept routing policy 260 may include one or more redirection IP addresses 264 that correspond to the IP addresses of the lawful intercept capture devices 110.

In addition, the lawful intercept routing table 105 may include a default routing policy 270 that includes a set of rules for routing data packets associated with default IP addresses that are within a range of default IP addresses 272 to a next hop network entity IP address 274. As an example, the next hop network entity IP address may be the IP address of a next hop network entity, such as a network router on the transport layer. In further examples, the default routing policy 270 may include multiple next hop network entity IP addresses 274 that may correspond to the clients 102. It should be understood that the range of default IP addresses 272 may include all IP addresses that are not within the range of lawful intercept IP addresses 262.

It should further be understood that when the network router 104 receives a data packet, the network router may analyze the origination IP address and/or the destination IP address of the data packet and compare the origination IP address and/or the destination IP address to the lawful intercept routing table 105. Any data packet whose origination IP address and/or destination IP address is within the range of lawful intercept IP addresses 262 is routed to the redirection IP address 264, in accordance with the lawful intercept routing policy 260. Any data packet whose origination IP address and/or destination IP address is within the range of default IP addresses 272 is routed to the next hop network entity IP address 274, in accordance with the default routing policy 270. In this way, all data packets received at the network router 104 are either routed to the redirection IP address 264 or the next hop network entity IP address 274.

Figure 3:
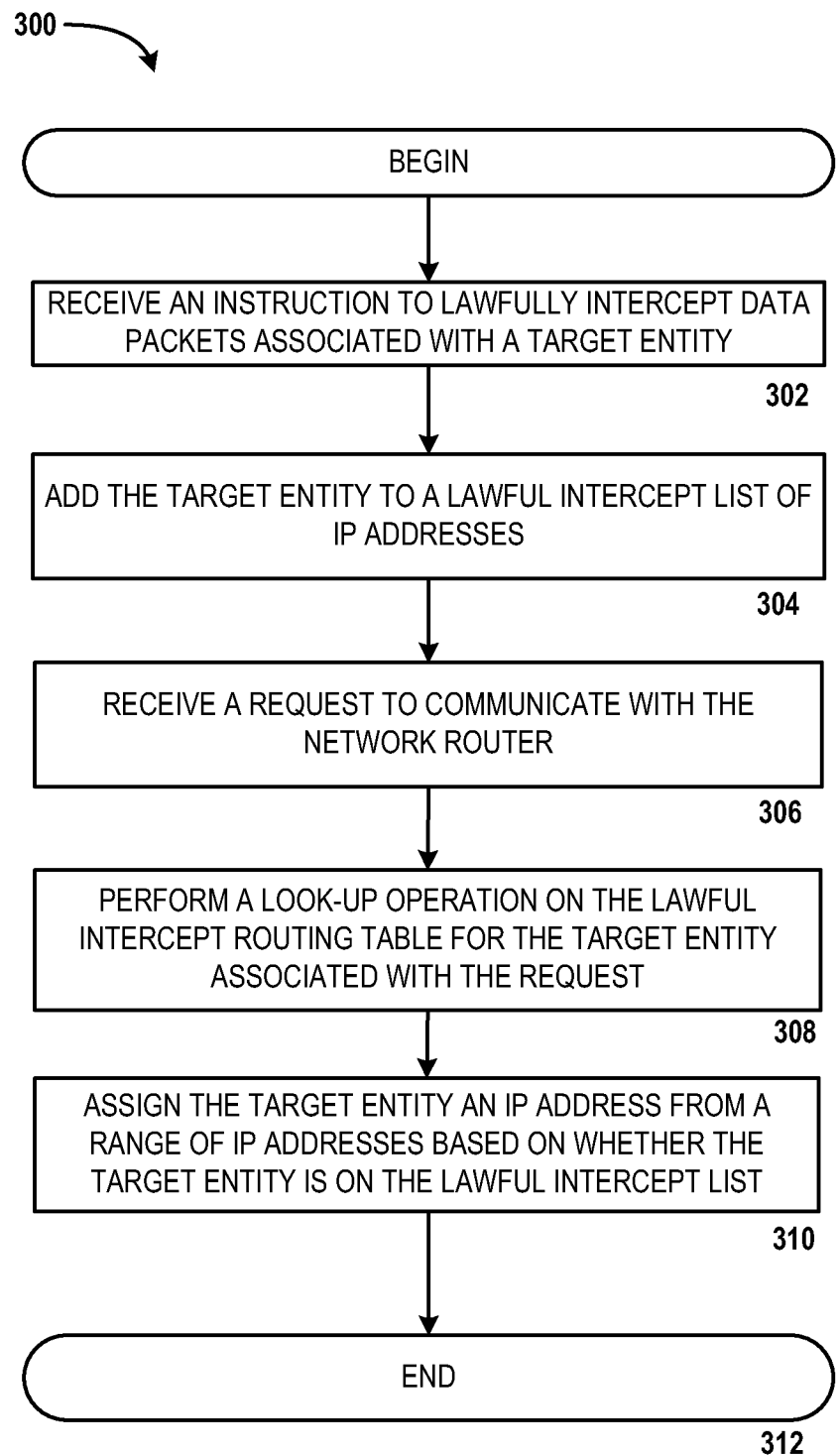
FIG. 3 is an example logical flow diagram illustrating aspects of a process for assigning an IP address to a target entity, according to various embodiments.
Figure 4:
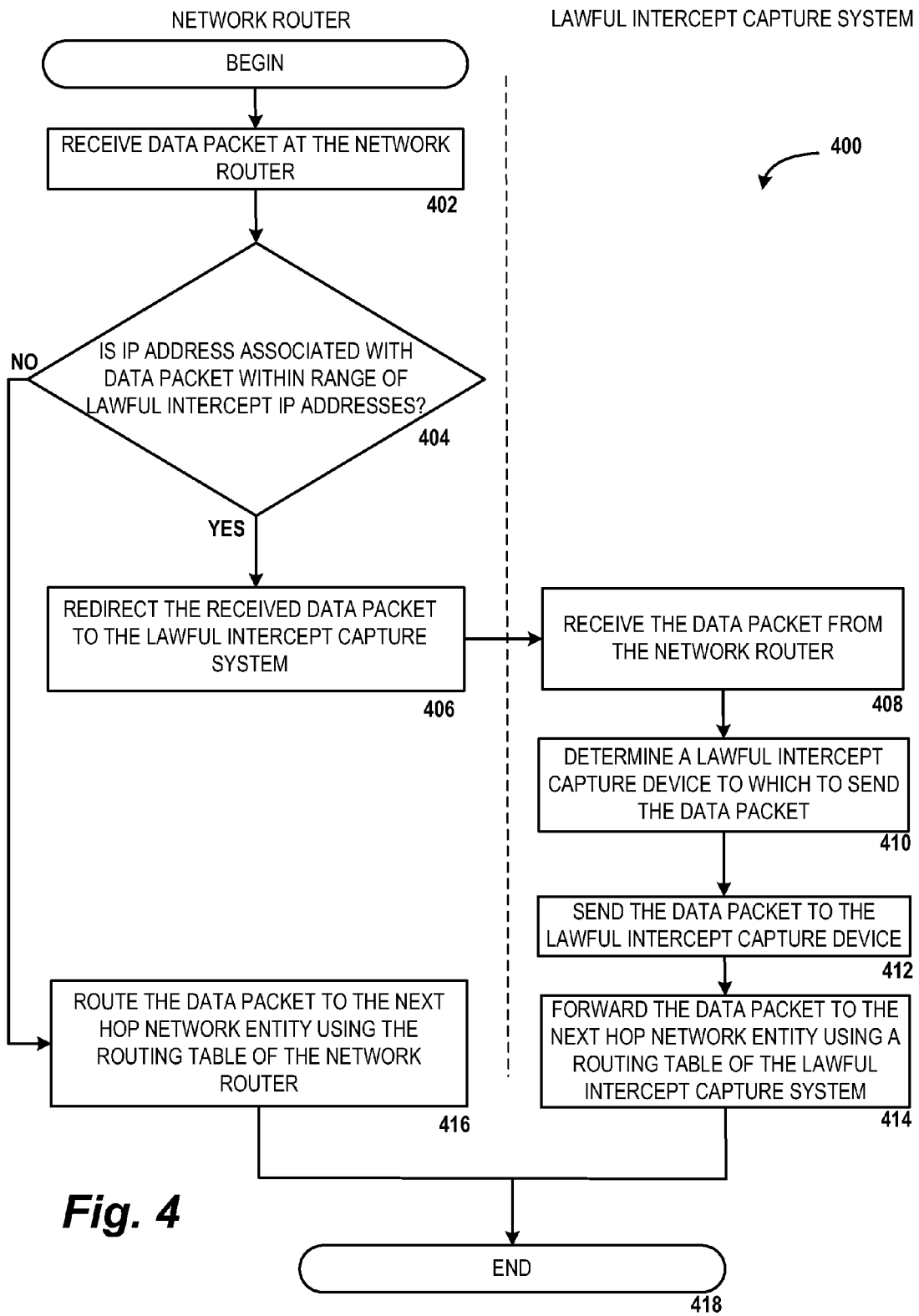
FIG. 4 is an example logical flow diagram illustrating aspects of a process for capturing a data packet associated with the target entity for purposes of lawful intercept, according to various embodiments.

Turning now to FIGS. 3 and 4, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

FIG. 3 is a logical flow diagram illustrating aspects of a process for assigning a target entity a lawful intercept IP address for purposes of lawful intercept, according to various embodiments presented herein. A routine 300 begins at operation 302, where the network router 104 receives an instruction from a computer system 114 to begin monitoring a target entity for purposes of lawful intercept. According to embodiments, when a telecommunication company is asked by a law enforcement agency to monitor a particular target entity, an operator of the telecommunication company may manually access the network router 104 from the computer system 114. The operator may send the instruction to the network router 104, via the computer system 114, to begin monitoring the target entity for purposes of lawful intercept. According to embodiments, the lawful intercept management module 210 of the network router 104 may receive the instruction. In further embodiments, the operator may be able to manually add the target entity to the lawful intercept list 208.

From operation 302, the routine 300 proceeds to operation 304, where upon receiving the instruction to begin monitoring the target entity, the network router 104 adds the target entity to the lawful intercept list 208. According to embodiments, the lawful intercept management module 210 may add the target entity to the lawful intercept list 208 such that when the target entity wants to communicate with the network router 104, the network router 104 may assign the target entity a lawful intercept IP address that has a corresponding routing policy that is defined in the lawful intercept routing table 105 of the network router 104.

From operation 304, the routine 300 proceeds to operation 306, where the network router 104 receives a request to communicate with the network router 104 from the target entity. The request may be a signal requesting an IP address or some other indication to the network router 104 that the target entity would like to communicate with the network router 104.

From operation 306, the routine 300 proceeds to operation 308, where the network router 104 performs a look-up operation on the lawful intercept list 208 for the target entity associated with the request to communicate with the network router 104. According to embodiments, the look-up operation may include searching the lawful intercept list 208 for the target entity. The lawful intercept list 208 may include a list of clients 102 that have been identified as target entities for purposes of lawful intercept.

From operation 308, the routine 300 proceeds to operation 310, where the network router 104 assigns an IP address to the target entity associated with the request to communicate with the network router 104. If the network router 104 determines that the target entity is on the lawful intercept list 208, the network router 104 may assign the target entity a lawful intercept IP address from the range of lawful intercept IP addresses 262 that correspond to the lawful intercept routing policy 260 defined in the lawful intercept routing table 105 for redirecting data packets associated with the lawful intercept IP address to the lawful intercept capture system 108. If, however, the network router 104 determines that the target entity is not on the lawful intercept list 208, the network router 104 may assign a default IP address from the range of default IP addresses 272 that correspond to the default routing policy 270 defined in the lawful intercept routing table 105 for forwarding data packets to the next hop network entity. From operation 310, the routine 300 ends at operation 312.

It should be appreciated that the network router 104 may be configured to stop monitoring a target entity by assigning a default IP address that is within the range of default IP addresses 272. In addition, the network router 104 may also remove the target entity from the lawful intercept list 208 such that the network router 104 does not assign a lawful intercept IP address to a target entity that is not identified for purposes of lawful intercept.

Referring now to FIG. 4, additional details for redirecting data packets associated with a target entity to a lawful intercept capture system, such as the lawful intercept capture system 108 prior to forwarding the data packets to a next hop network entity toward the final destination of the data packets will be provided according to embodiments of the present disclosure. In particular, FIG. 4 is a logical flow diagram illustrating aspects of a process for redirecting data packets associated with the target entity for lawful intercept, according to various embodiments.

A routine 400 begins at operation 402, where the network router 104 receives a data packet. The data packet may include an origination IP address and a destination IP address. The network router 104 may receive the data packet from the network 106 or from one of the clients 102, which may be a target entity identified for purposes of lawful intercept, such as client 102A or a client 102B that is not identified for purposes of lawful intercept.

From operation 402, the routine 400 continues to operation 404, where the network router 104 may determine whether either the origination IP address or the destination IP address associated with the data packet is within the range of lawful intercept IP addresses 262 that correspond to the lawful intercept routing policy 260 for redirecting the data packets to the lawful intercept capture system 108. If the network router 104 determines that both the origination IP address and the destination IP address are not within the range of lawful intercept IP addresses 262, the routine 400 proceeds from operation 404 to operation 416, where the data packet is routed to the next hop network entity as defined by the default routing policy 270 of the lawful intercept routing table 105. The next hop network entity may be a network router in the transport network, the client 102B, or any other network entity that lies in the data path between the origination IP address and the destination IP address of the data packet.

If, however, at operation 404, the network router 104 determines that the origination IP address or the destination IP address associated with the data packet lies within the range of lawful intercept IP addresses 262, the routine 400 proceeds from operation 404 to operation 406, where the network router 104 redirects the data packet to the lawful intercept capture system 108. According to embodiments, the data packet may be redirected to the lawful intercept capture system 108 based on the lawful intercept routing policy 260 associated with the lawful intercept IP address. The lawful intercept routing policy 260 may indicate the redirection IP address 264 associated with the lawful intercept capture system 108 to which to route the data packet associated with the lawful intercept IP address.

From operation 406, the routine 400 proceeds to operation 408, where the lawful intercept capture system 108 receives the data packet from the network router 104. From operation 408, the routine 400 proceeds to operation 410, where the lawful intercept capture system 108 determines a lawful intercept capture device to which to send the data packet. According to embodiments, the lawful intercept capture system 108 may utilize the load balancing selection application 111 to determine the lawful intercept capture device to which the data packet should be sent. The load balancing selection application 111 may determine utilization information associated with one or more of the lawful intercept capture devices 110. The lawful intercept capture system 108 may then select an appropriate lawful intercept capture device, based in part, on the current and forecasted utilization of the one or more lawful intercept capture devices 110, for capturing the data packet.

From operation 410, the routine 400 continues to operation 412, where the data packet is sent to the lawful intercept capture device selected by the lawful intercept capture system 108. From operation 412, the routine 400 proceeds to operation 414, where the selected lawful intercept capture device captures the data packet. According to embodiments, the lawful intercept capture device 110A may capture the data packet on a storage device within the access network, within the lawful intercept capture system 108, or at some other local or remote storage device accessible to the lawful intercept capture device 110A.

From operation 414, the routine 400 continues to operation 416, where the lawful intercept capture device 110A forwards the data packet to the next hop network entity using a routing table 112. According to embodiments, the lawful intercept capture device performs a look-up on the routing table 112 of the lawful intercept capture system 108 to determine the next hop network entity to which the lawful intercept capture device should forward the data packet. Upon determining the network entity to which the data packet is to be forwarded, the lawful intercept capture device forwards the data packet to the next hop network entity. In this way, the lawful intercept capture device forwards the data packet toward the destination IP address associated with the data packet. If the data packet is destined for the Internet, the lawful intercept capture device may route the data packet to a network entity, such as a network router within the distribution network on the way to the data packet's final destination. If the data packet is destined for one of the clients 102, such as client 102A, the lawful intercept capture device may route the data packet toward the client 102A, which may be the data packet's final destination. From operation 414, the routine 400 ends at operation 418.

Figure 5:
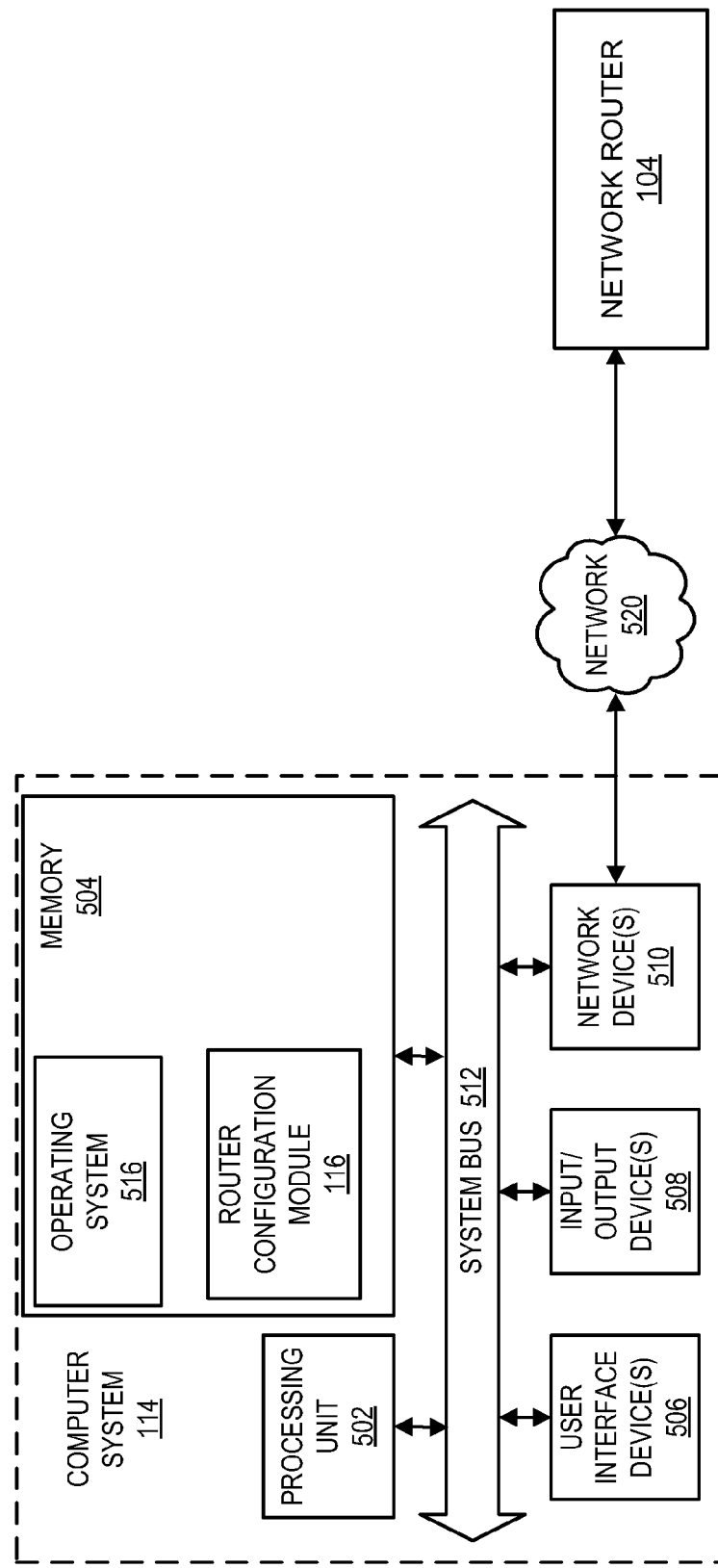
FIG. 5 is an example block diagram illustrating an exemplary computer system configured to control aspects of the network router, according to various embodiments.

FIG. 5 is a block diagram illustrating the computer system 114 configured to control aspects of the network router, in accordance with embodiments. The computer system 114 includes a processing unit 502, a memory 504, one or more user interface devices 506, one or more input/output ("I/O") devices 508, and one or more network devices 510, each of which is operatively connected to a system bus 512. The system bus 512 enables bi-directional communication between the processing unit 502, the memory 504, the user interface devices 506, the I/O devices 508, and the network devices 510.

The processing unit 502 may be a standard central processor that performs arithmetic and logical operations, a more specific purpose programmable logic controller ("PLC"), a programmable gate array, or other type of processor known to those skilled in the art and suitable for controlling the operation of the server computer. Processing units are well-known in the art, and therefore not described in further detail herein.

The memory 504 communicates with the processing unit 502 via the system bus 512. In one embodiment, the memory 504 is operatively connected to a memory controller (not shown) that enables communication with the processing unit 502 via the system bus 512. The memory 504 includes an operating system 516 and one or more program modules according to exemplary embodiments. Examples of operating systems, such as the operating system 516, include, but are not limited to, WINDOWS, WINDOWS CE, and WINDOWS MOBILE from MICROSOFT CORPORATION, LINUX, SYMBIAN from SYMBIAN LIMITED, BREW from QUALCOMM CORPORATION, MAC OS from APPLE CORPORATION, and FREEBSD operating system. Examples of the program modules include the router configuration module 116. According to embodiments, the program modules may be embodied in hardware, software, firmware, or any combination thereof.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 114.

The user interface devices 506 may include one or more devices with which a user accesses the computer system 114. The user interface devices 506 may include, but are not limited to, computers, servers, personal digital assistants, cellular phones, or any suitable computing devices. The I/O devices 508 enable a user to interface with the program modules. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, or an electronic stylus. Further, the I/O devices 508 may include one or more output devices, such as, but not limited to, a display screen or a printer.

The network devices 510 enable the computer system 114 to communicate with other networks, remote systems, or more specifically, network routers, such as network router 104 via a network 520. Examples of the network devices 510 may include, but are not limited to, a modem, a radio frequency ("RF") or infrared ("IR") transceiver, a telephonic interface, a bridge, a router, or a network card. The network 520 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 520 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN"). According to embodiments, the network 520 may be the same network as network 106, previously discussed in FIG. 1.

Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

What is claimed is:

1. A method comprising:
   receiving, at a network router that stores a lawful intercept routing table, an instruction to monitor data packets associated with a target entity for a purpose of lawful intercept;
   adding, by the network router, the target entity to a lawful intercept list;
   assigning, by the network router, a lawful intercept internet protocol (IP) address from a range of lawful intercept IP addresses to the target entity added to the lawful intercept list, the lawful intercept IP address having a corresponding routing policy for routing data packets associated with the lawful intercept IP address to a lawful intercept capture system;
   upon receiving a data packet, identifying, by the network router, an origination IP address associated with the data packet and a destination IP address associated with the data packet;
   determining, by the network router, if one of the origination IP address and the destination IP address is in the range of lawful intercept IP addresses, wherein determining if the one of the origination IP address and the destination IP address is in the range of lawful intercept IP addresses comprises performing a look-up operation by searching the lawful intercept list for the origination IP address and the destination IP address;
   if a determination is made that one of the the origination IP address and the destination IP address is in the range of lawful intercept IP addresses, redirecting, by the network router, the data packet to the lawful intercept capture system based on the corresponding routing policy;
   receiving, at the network router, a request to stop monitoring the data packets associated with the target entity for the purpose of lawful intercept; and
   removing, by the network router, the target entity from the lawful intercept list.

2. The method of claim 1, further comprising if a determination is made that the one of the origination IP address and the destination IP address is not in the range of lawful intercept IP addresses, routing the data packet to a next hop network entity based on a default routing policy of the destination IP address.

3. The method of claim 1, further comprising in response to receiving the request to stop the monitoring, assigning the target entity a default IP address from a range of default IP addresses, each of the default IP addresses corresponding to a default routing policy for routing data packets associated with the default IP address to a next hop network entity.

4. The method of claim 1, wherein the lawful intercept capture system includes a plurality of lawful intercept capture devices, and wherein redirecting the data packet comprises:
   selecting a lawful intercept capture device from the plurality of lawful intercept capture devices to which to send the data packet; and
   redirecting the data packet to the selected lawful intercept capture device.

5. The method of claim 4, wherein selecting a lawful intercept capture device from the plurality of lawful intercept capture devices to which to send the data packet comprises:
   receiving utilization information associated with the plurality of lawful intercept capture devices, the utilization information indicating a current utilization of the plurality of lawful intercept capture devices and a forecasted utilization of the plurality of lawful intercept capture devices; and
   selecting the lawful intercept capture device from the plurality of lawful intercept capture devices based on the utilization information.

6. The method of claim 1, wherein redirecting the data packet to the lawful intercept capture system based on the routing policy of the lawful intercept IP address comprises:
   performing a look-up operation of the lawful intercept IP address in the lawful intercept routing table; and
   sending the data packet to the lawful intercept capture system based on the routing policy associated with the lawful intercept IP address.

7. The method of claim 1, further comprising
   defining, by the network router within the lawful intercept routing table, a first routing policy for a first group of IP addresses from the range of lawful intercept IP address; and
   defining, by the network router within the lawful intercept routing table, a second routing policy for a second group of IP addresses from the range of lawful intercept IP address.

8. A system comprising:
   a processor; and
   a memory that stores instructions that, when executed by the processor, cause the processor to perform operations comprising
      receiving an instruction to monitor data packets associated with a target entity for a purpose of lawful intercept,
      adding the target entity to a lawful intercept list, assigning a lawful intercept internet protocol (IP) address from a range of lawful intercept IP addresses to the target entity added to the lawful intercept list, the lawful intercept IP address having a corresponding routing policy for routing data packets associated with the lawful intercept IP address to a lawful intercept capture system, upon receiving a data packet, identifying an origination IP address associated with the data packet and a destination IP address associated with the data packet, determining if one of the origination IP address and the destination IP address is in the range of lawful intercept IP addresses, wherein determining if the one of the origination IP address and the destination IP address is in the range of lawful intercept IP addresses comprises performing a look-up operation by searching the lawful intercept list for the origination IP address and the destination IP address, if a determination is made that the one of the origination IP address and the destination IP address is in the range of lawful intercept IP addresses, redirecting the data packet to the lawful intercept capture system based on the corresponding routing policy, receiving a request to stop monitoring the data packets associated with the target entity for the purpose of lawful intercept, and removing the target entity from the lawful intercept list.

9. The system of claim 8, further comprising instructions that, when executed by the processor, cause the processor to perform operations further comprising: if a determination is made that the one of the origination IP address and the destination IP address is not in the range of lawful intercept IP addresses, routing the data packet to a next hop network entity based on a default routing policy of the destination IP address.

10. The system of claim 8, further comprising instructions that, when executed by the processor, cause the processor to perform operations further comprising: in response to receiving the request to stop the monitoring, assigning the target entity a default IP address from a range of default IP addresses, each of the default IP addresses corresponding to a default routing policy for routing data packets associated with the default IP address to a next hop network entity.

11. The system of claim 8, wherein the lawful intercept capture entity includes a plurality of lawful intercept capture devices, and wherein the instructions, when executed by the processor, cause the the processor, cause the processor to perform operations further comprising:

selecting a lawful intercept capture device from the plurality of lawful intercept capture devices to which to send the data packet; and redirecting the data packet to the selected lawful intercept capture device.

12. The system of claim 11, wherein selecting a lawful intercept capture device from the plurality of lawful intercept capture devices to which to send the data packet comprises:

receiving utilization information associated with the plurality of lawful intercept capture devices, the utilization information indicating a current utilization of the plurality of lawful intercept capture devices and a forecasted utilization of the lawful intercept capture devices; and selecting the lawful intercept capture device from the plurality of lawful intercept capture devices based on the utilization information.

13. The system of claim 8, wherein redirecting the data packet to the lawful intercept capture entity based on the routing policy of the lawful intercept IP address comprises:

performing a look-up operation of the lawful intercept IP address in a routing table; and sending the data packet to the lawful intercept capture entity based on the routing policy associated with the lawful intercept IP address.

14. A non-transitory computer-readable medium, having instructions stored thereon that, when executed by a processor, cause the processor to perform operations comprising:

receiving an instruction to monitor data packets associated with a target entity for the purpose of lawful intercept;

adding the target entity to a lawful intercept list;

assigning the target entity a lawful intercept internet protocol (IP) address from a range of lawful intercept IP addresses to the target entity added to the lawful intercept list, the lawful intercept IP address having a corresponding routing policy for routing data packets associated with the lawful intercept IP address to a lawful intercept capture system;

upon receiving a data packet, identifying an origination IP address associated with the data packet and a destination IP address associated with the data packet;

determining if one of the origination IP address and the destination IP address is in the range of lawful intercept IP addresses, wherein determining if the one of the origination IP address and the destination IP address is in the range of lawful intercept IP addresses comprises performing a look-up operation by searching the lawful intercept list for the origination IP address and the destination IP address;

if a determination is made that the one of the origination IP address and the destination IP address is in the range of lawful intercept IP addresses, redirecting the data packet to the lawful intercept capture system based on the corresponding routing policy of the lawful intercept IP address;

receiving a request to stop monitoring the data packets associated with the target entity for the purpose of lawful intercept; and removing the target entity from the lawful intercept list.

15. The non-transitory computer-readable medium of claim 14, further comprising instructions that, when executed by the processor, cause the processor to perform operations further comprising: in response to a determination that the one of the origination IP address and the destination IP address is not in the range of lawful intercept IP addresses, routing the data packet to a next hop network entity based on a default routing policy of the destination IP address.

16. The non-transitory computer-readable medium of claim 14, further comprising instructions that, when executed by the processor, cause the processor to perform operations further comprising: in response to receiving the request to stop the monitoring, assigning the target entity a default IP address from a range of default IP addresses, each of the default IP addresses corresponding to a default routing policy for routing data packets associated with the default IP address to a next hop network entity.

17. The non-transitory computer-readable medium of claim 14, wherein redirecting the data packet to the lawful intercept capture system based on the routing policy of the lawful intercept IP address comprises:

performing a look-up operation of the lawful intercept IP address in a routing table; and sending the data packet to the lawful intercept capture system based on the routing policy associated with the lawful intercept IP address.

* * * * *

UNITED STATES PATENT AND TRADEMARK OFFICE
CERTIFICATE OF CORRECTION

| | | |
|---|---|---|
| PATENT NO. | : 8,756,339 B2 | Page 1 of 1 |
| APPLICATION NO. | : 12/818686 | |
| DATED | : June 17, 2014 | |
| INVENTOR(S) | : David Harp | |

It is certified that error appears in the above-identified patent and that said Letters Patent is hereby corrected as shown below:

In the Claims

Col. 17, in claim 11, line 46, replace "processor, cause the the processor, cause" with --processor, cause--.

Signed and Sealed this
Eleventh Day of November, 2014

Michelle K. Lee
*Deputy Director of the United States Patent and Trademark Office*